US 7,554,640 B2

(12) United States Patent
Ono (10) Patent No.: US 7,554,640 B2
(45) Date of Patent: Jun. 30, 2009

(54) LCD DEVICE HAVING A SET OF COMB-LIKE ELECTRODES OF RED, GREEN AND BLUE PIXELS IN A ROW EXTENDING IN A FIRST DIRECTION AND A SET OF ELECTRODES OF A WHITE PIXEL IN THE ROW EXTENDING IN A SECOND DIFFERENT DIRECTION

(75) Inventor: Kikuo Ono, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 253 days.

(21) Appl. No.: 11/109,658

(22) Filed: Apr. 20, 2005

(65) Prior Publication Data
US 2005/0237447 A1 Oct. 27, 2005

(30) Foreign Application Priority Data
Apr. 21, 2004 (JP) ............................. 2004-125340

(51) Int. Cl.
G02F 1/1343 (2006.01)
(52) U.S. Cl. ...................... 349/141; 349/145; 349/146; 349/106
(58) Field of Classification Search ................ 349/141, 349/145, 146, 106–109
See application file for complete search history.

(56) References Cited

U.S. PATENT DOCUMENTS

| 6,667,790 | B2 * | 12/2003 | Yanagawa et al. ............ 349/139 |
| 7,057,698 | B2 * | 6/2006 | Chung et al. ................. 349/141 |
| 2001/0000439 | A1 * | 4/2001 | Ohta et al. ................... 349/141 |
| 2004/0046725 | A1 * | 3/2004 | Lee .............................. 345/88 |
| 2004/0263748 | A1 * | 12/2004 | Park et al. .................... 349/141 |

* cited by examiner

Primary Examiner—David Nelms
Assistant Examiner—John Heyman
(74) Attorney, Agent, or Firm—Antonelli, Terry, Stout & Kraus, LLP.

(57) ABSTRACT

The present invention provides a liquid crystal display device which constitutes a unit pixel for color display using pixels having color filters of respective colors consisting of red, green, blue and white and is capable of achieving a suitable multi-domain effect. In a liquid crystal display device which includes red, green, blue and white color filters in respective pixels which are arranged close to each other, the inclination of extending direction of electrodes of the respective pixels is equal with respect to the respective pixels having the red, green and blue color filters and is different with respect to the pixel having the white color filter.

19 Claims, 9 Drawing Sheets

| R(L) | G(L) |
|------|------|
| W(R) | B(L) | y ↑ → x

FIG. 11B

| R(L) | G(L) | R(R) | G(R) |
|------|------|------|------|
| W(R) | B(L) | W(L) | B(R) |

FIG. 11C

| R(L) | G(L) |
|------|------|
| W(R) | B(L) |
| R(R) | G(R) |
| W(L) | B(R) |

FIG. 11D

| R(L) | G(L) | R(R) | G(R) |
|------|------|------|------|
| W(R) | B(L) | W(L) | B(R) |
| R(R) | G(R) | R(L) | G(L) |
| W(L) | B(R) | W(R) | B(L) |

FIG. 12A

| R(L) | G(R) |
|---|---|
| W(R) | B(L) |

FIG. 12B

| R(L) | G(R) | R(R) | G(L) |
|---|---|---|---|
| W(R) | B(L) | W(L) | B(R) |

FIG. 12C

| R(L) | G(R) |
|---|---|
| W(R) | B(L) |
| R(R) | G(L) |
| W(L) | B(R) |

FIG. 12D

| R(L) | G(R) | R(R) | G(L) |
|---|---|---|---|
| W(R) | B(L) | W(L) | B(R) |
| R(R) | G(L) | R(L) | G(R) |
| W(L) | B(R) | W(R) | B(L) |

LCD DEVICE HAVING A SET OF COMB-LIKE ELECTRODES OF RED, GREEN AND BLUE PIXELS IN A ROW EXTENDING IN A FIRST DIRECTION AND A SET OF ELECTRODES OF A WHITE PIXEL IN THE ROW EXTENDING IN A SECOND DIFFERENT DIRECTION

BACKGROUND OF THE INVENTION

1. Field of the Invention

The present invention relates to a liquid crystal display device, and more particularly to the improvement of a display property of a liquid crystal display device which performs a color display.

2. Description of the Related Art

A liquid crystal display device includes a pair of substrates which face each other in an opposed manner and the liquid crystal composition which is sandwiched by two substrates. Pixels are formed on the substrate in a matrix array. The plurality of these pixels constitute a display part of the liquid crystal display device.

Further, there has been known a liquid crystal display device which has the following constitution and exhibits the favorable display quality with a relatively wide angle. Each pixel includes pixel electrodes and counter electrodes on one substrate out of the above-mentioned respective substrates. At least one of these respective electrodes constitutes strip-like electrodes which extend in one direction and the strip-like electrodes are arranged in a plural number in parallel and constitute a group of electrodes. Liquid crystal is driven by electric fields which are generated between the pixel electrodes and the counter electrodes on one substrate.

In this case, even when the orientation of molecules of the liquid crystal is in the same state, the polarization state of the transmitting light is changed depending on the incident direction of the light which is incident on a liquid crystal display panel and hence, the optical transmissivity differs in response to the incident direction.

Such viewing angle dependency of the liquid crystal display panel induces an inverse phenomenon of brightness when a viewing point is inclined obliquely with respect to the viewing angle direction and hence, the liquid crystal display panel exhibits the display property that an image is colored in a color display.

Accordingly, there has been known a technique which compensates for coloring of the image depending on the viewing angle by making the extending direction of one electrodes different from each other pixel by pixel with respect to the neighboring pixels thus making the orientation of molecules of the liquid crystal driven by an electric field different from each other. This technique adopts the so-called multi-domain method. U.S. Pat. No. 6,456,351 discloses the multi-domain method.

On the other hand, there has been also known a liquid crystal display device which has the following constitution. That is, although it is usual that the liquid crystal display device for color display usually includes respective filters of red, green and blue in the three neighboring pixels and these pixels form a single unit pixel for color display, a pixel having a color filer which corresponds to white (hereinafter referred to as the white color filter) is added thus forming a unit pixel for color display having these four pixels.

In JP-A-11-295717, there is disclosed a liquid crystal display device which includes a color filter corresponding to white. In the liquid crystal display device which includes the white color filter, it is possible to enhance the white brightness of an image and can, eventually, control the color temperature independently from color tones of three primary colors.

SUMMARY OF THE INVENTION

Here, when the multi-domain method is further adopted in constituting four pixels as the unit pixel for color display in the above-mentioned manner, several attempts have been made to provide the preferable constitutions in view of properties of the pixel which includes the white color filter which is newly added.

The present invention has been made under such circumstances and it is an object of the present invention to provide a liquid crystal display device which forms pixels having color filters of respective colors consisting of red, green, blue and white into a unit pixel for color display and is capable of achieving a preferable multi-domain effect.

To briefly explain the summary of typical inventions among the inventions disclosed in this specification, they are as follows.

(1) The liquid crystal display device according to the present invention is, for example, directed to a liquid crystal display device which includes red, green, blue and white color filters in respective pixels which are arranged close to each other, wherein the inclination of extending directions of electrodes of respective pixels is equal with respect to the respective pixels which include the red, green and blue color filers and is different with respect to the pixel which includes the white color filter.

(2) The liquid crystal display device according to the present invention is, for example, on the premise of the constitution (1), characterized in that the respective pixels which are arranged close to each other form a unit pixel, and with respect to the relationship between one unit pixel and another unit pixel which is arranged close to one unit pixel, the corresponding pixels have the color filters of the same color and have the inclinations of the extending direction of the electrodes arranged in a line symmetry.

(3) The liquid crystal display device according to the present invention is, for example, directed to a liquid crystal display device which includes red, green, blue and white color filters in respective pixels which are arranged close to each other, wherein the inclinations are imparted in the extending directions of the electrodes of the respective pixels, the inclinations are arranged in a line symmetry with respect to the pixels which are arranged close to each other. For example, the respective pixels which are arranged close to each other constitute one unit pixel for color display. Red, green, blue and white color filters are provided to respective pixels. With respect to the first unit pixel and the second unit pixel which is arranged close to the first unit pixel, the corresponding pixels have the color filters of the same color and, at the same time, the electrodes of the respective pixels of the first unit pixel have the inclinations in the extending direction, and the inclinations are arranged in a line symmetry with respect to the pixels which are arranged close to each other. The inclinations in the extending direction of the electrodes of the respective pixels of the second unit pixel are arranged in a line symmetry with respect to the pixel having the same color filter of the first unit pixel.

(4) The liquid crystal display device according to the present invention is, for example, based on any one of the constitutions (1) to (3), characterized in that the respective pixels which are arranged close to each other are arranged in an array of 2×2.

(5) The liquid crystal display device according to the present invention is, for example, based on any one of the constitutions (1) to (3), characterized in that the respective pixels which are arranged close to each other are arranged in an array of 1×4.

(6) The liquid crystal display device according to the present invention is, for example, based on any one of the constitutions (1) to (3), is characterized in that, in each pixel, one electrode, an insulation layer and another electrode are provided in a stacked manner within a region of a surface of a substrate, and another electrode is formed on one electrode in an overlapped manner and is constituted of a group of electrodes consisting of a plurality of electrodes which are arranged in parallel.

(7) The liquid crystal display device according to the present invention is, for example, based on any one of the constitutions (1) to (3), is characterized in that, in each pixel, one electrode and another electrode are provided within a region of a surface of a substrate, and each electrode is constituted of a group of electrodes consisting of a plurality of electrodes, and in a plan view, the respective electrodes of one electrode and the respective electrodes of another electrode are arranged alternately.

Here, the present invention is not limited to the above-mentioned constitution and various modifications can be made without departing from the technical concept of the present invention.

By providing the constitution (1) to the liquid crystal display device, the respective pixels which include the respective red, green and blue color filters can reduce the light transmission quantity due to these color filters, while the pixel which includes the white color filter is not provided with the color filter at the portion and hence, the reduction of the light transmission quantity attributed to the color filter is not generated.

Accordingly, it is possible to set the total light transmission quantity of three pixels which include the color filters substantially equal to the light transmission quantity in one pixel which is not provided with the color filter (which is provided with the white filter).

Accordingly, in adopting the multi-domain method, by setting the inclinations of the extending directions of the electrodes of respective pixels to an equal value with respect to the respective pixels which include the red, green and blue color filters and to a value different from the above value with respect to the pixel which includes the white color filter whereby it is possible to obtain an advantageous effect that the coloring of an image attributed to a viewing angle can be compensated without generating the difference in the light transmission quantity.

By adopting the constitution (3) in which with respect to the respective pixels which include the respective red, green and blue color filters, the inclinations of the extending directions of the electrodes of the respective pixels are made different from each other between the neighboring pixels, although the inclinations of the electrodes in two pixels become equal, the inclinations of the electrodes in remaining one pixel become different from the inclinations of the electrodes in two pixels.

Accordingly, with respect to the pixel which includes the white color filter, by setting the inclinations of the electrodes in the pixel equal to the inclination of the pixels in one remaining pixel, it is possible to set the inclinations of the extending directions of the electrodes in respective pixels uniform.

In this case, to make the multi-domain effect more uniform, the inclinations of the extending directions of the electrodes is arranged in a line symmetry between the pixels which are arranged close to each other.

Out of two unit pixels, one unit pixel for color display and another unit pixel for color display which is arranged close to one unit pixel are made different from each other. In the pixel which includes the white color filter in another unit pixel for color display, the extending direction of the electrode is made different from the extending direction of the electrode of the pixel which includes the white color filter in one unit pixel for color display.

This provision is provided for achieving the multi-domain effect in the pixel which includes the white color filter in a state that the multi-domain effect also extends to other neighboring unit pixel.

DETAILED DESCRIPTION OF THE PREFERRED EMBODIMENTS

Hereinafter, an embodiment of a liquid crystal display device according to the present invention is explained in conjunction with drawings.

Figure 6:
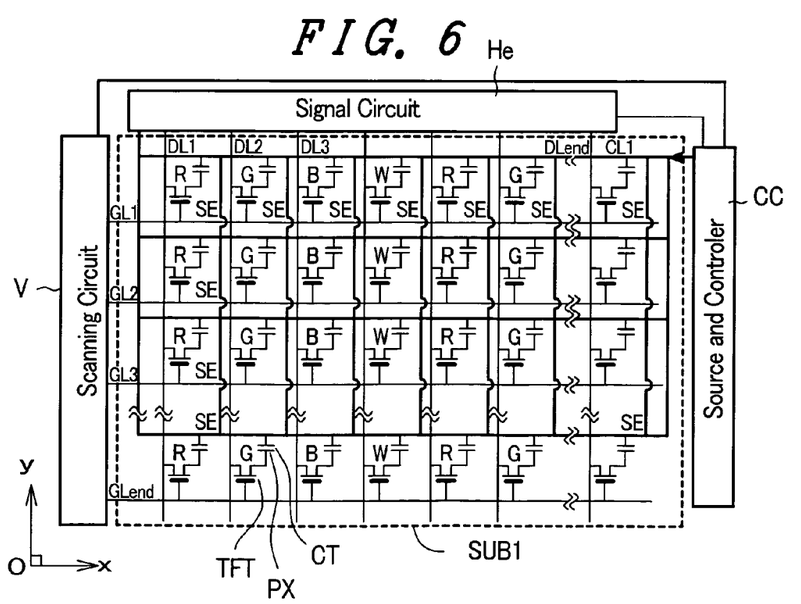
FIG. 6 is an equivalent circuit diagram showing one embodiment of a liquid crystal display device according to the present invention.

FIG. 6 is an equivalent circuit diagram showing one embodiment of the liquid crystal display device according to the present invention. That is, FIG. 6 shows a circuit diagram which is formed on a liquid-crystal-side surface of one substrate SUB1 of a pair of substrates which are arranged to face each other with liquid crystal therebetween.

On the liquid-crystal-side surface of one transparent substrate SUB1, gate signal lines GL (GL1, GL2, . . . GLend) which extend in the x direction and are arranged in parallel in the y direction and drain signal lines DL (DL1, DL2, . . . DLend) which extend in the y direction and are arranged in parallel in the x direction are formed and regions which are surrounded by these signal lines constitute pixel regions.

Further, counter voltage signal lines CL (CL1, CL2, . . . CLend) each of which runs the inside of each group of pixel regions which are arranged in parallel in the x direction are formed and each counter voltage signal line CL has both ends thereof connected with the counter voltage signal lines CL which are formed in the inside of other group of pixel regions. This provision is made to reduce the electric resistance in the counter voltage signal lines CL as a whole.

The counter voltage signal lines CL are connected with counter electrodes CT described later which are formed in the respective pixel regions and are configured to supply a voltage signal which becomes the reference with respect to a video signal supplied to the liquid crystal display device.

In each pixel region, a thin film transistor TFT which is turned on in response to a signal (a scanning signal) from the gate signal line GL, a pixel electrode PX to which the signal (video signal) is supplied from the drain signal line DL via the thin film transistor TFT, and the counter electrode CT which generates an electric field between the pixel electrode PX and the counter electrode CT are formed.

One ends of respective gate signal lines GL are connected to a scanning circuit (a scanning signal drive circuit) V and the scanning circuit V supplies the scanning signal to the respective gate signal lines GL.

One ends of respective drain signal lines DL are connected to a signal circuit (a video signal drive circuit) He and the signal circuit He sequentially supplies the video signal to the respective drain signal lines DL in conformity with timing of supplying the scanning signal.

Further, the scanning circuit V and the signal circuit He are controlled by a power source/controller CC.

Figure 1:
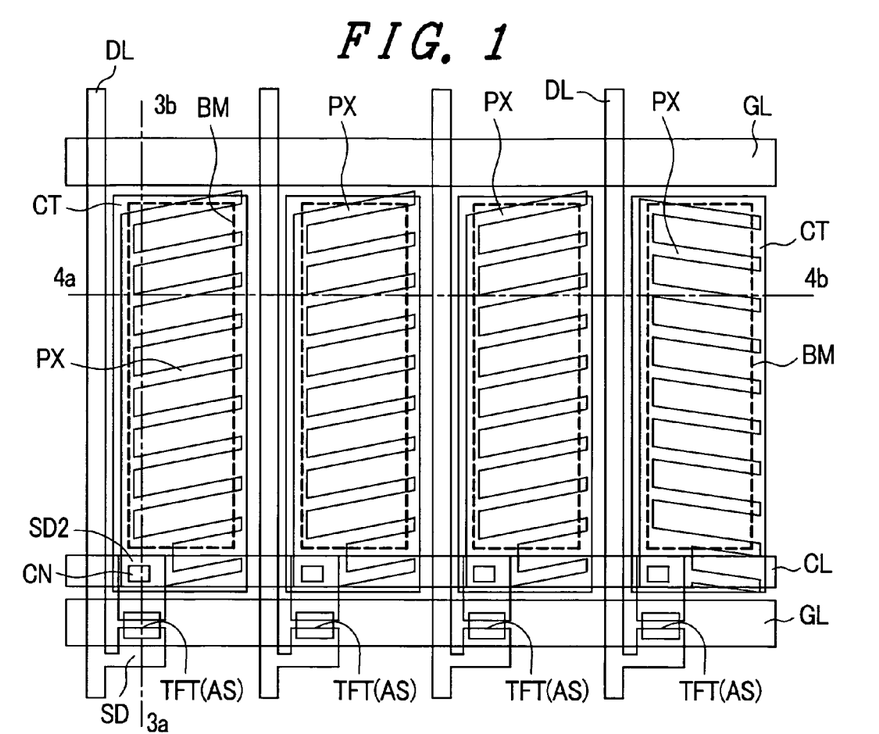
FIG. 1 is a plan view showing one embodiment of a pixel on one substrate side of a liquid crystal display device according to the present invention.

FIG. 1 is a plan view showing one embodiment of the constitution of the pixel formed in the pixel region and shows one unit pixel for color display. One unit pixel is constituted of four pixels which are connected with each other in the x direction. That is, in respective pixels arranged from the left side to the right side of the drawing, for example, a color filter FIL of red (R), a color filter FIL of green (G), a color filter FIL of blue (B) are provided and no color filter FIL is formed on the rightmost pixel.

Here, in the explanation made in this specification, there may be a case in which the pixel which is not provided with the color filter FIL is referred to, for the sake of comparison with other color filters FIL, as the pixel which is provided with a color filter FIL of white (W).

Further, the constitutions of the respective pixels are substantially equal except for the color filters FIL and hence, only one pixel is explained hereinafter.

Figure 3:
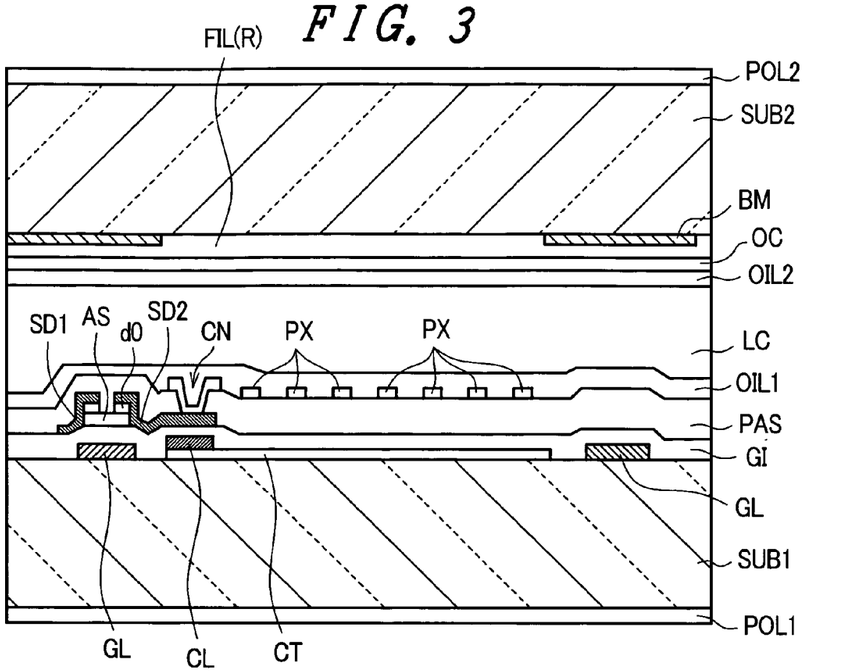
FIG. 3 is a cross-sectional view taken along a line 3a-3b in FIG. 1.
Figure 4:
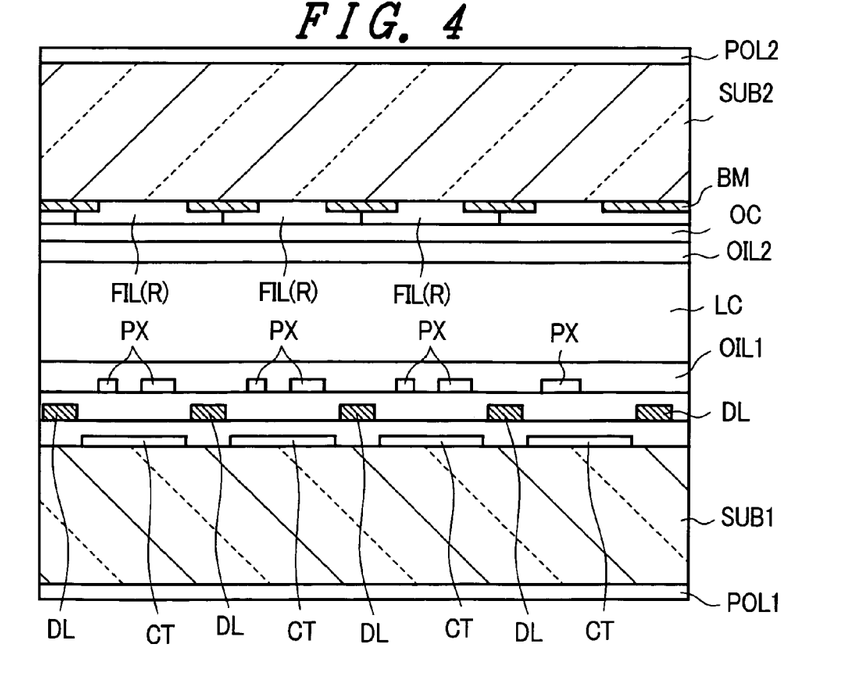
FIG. 4 is a cross-sectional view taken along a line 4a-4b in FIG. 1.

Here, a cross section taken along a line 3a-3b in FIG. 1 is shown in FIG. 3 and a cross section taken along a line 4a-4b in FIG. 1 is shown in FIG. 4.

First of all, on a surface of the pixel region of the transparent substrate SUB1, the counter electrode CT is formed. The counter electrode CT is formed on a center portion except for a minute peripheral portion of the pixel region and is formed of a light transmitting conductive layer made of a material such as ITO (Indium Tin Oxide), ITZO (Indium Tin Zinc Oxide), IZO (Indium Zinc Oxide), ZnO (Zinc Oxide), SnO (Tin Oxide), $In_2O_3$ (Indium Oxide). This provision is provided for enhancing a so-called numerical aperture of the pixel.

Then, the gate signal lines GL which extend in the x direction and are arranged in parallel in the y direction are formed and, further, the counter voltage signal line CL is formed. The counter voltage signal line CL is formed simultaneously with the formation of the gate signal line GL, for example. In this case, the counter voltage signal line CL is formed using the same material layer as the gate signal line GL. The counter voltage signal line CL is directly overlapped to the counter electrode CT so that the counter voltage signal line CL is electrically connected with the counter electrode CT.

On a surface on which the gate signal line GL and the like are formed, an insulation film GI is formed in a state that the insulation film GI also covers the gate signal line GL and the like. The insulation film GI functions as a gate insulation film in a region where the thin film transistor TFT is formed as described later and also functions as an interlayer insulation film for the gate signal line GL and the like with respect to the drain signal line DL described later.

A semiconductor layer AS is formed on a surface of the insulation film GI in a state that the semiconductor layer AS is overlapped to a portion of the gate signal line GL. The semiconductor layer AS is a semiconductor layer of the thin film transistor TFT, wherein by forming a drain electrode SD1 and a source electrode SD2 on a surface of the semiconductor layer AS, the thin film transistor TFT formed of an MIS (Metal Insulator Semiconductor) having the so-called inverse staggered structure is formed.

The drain electrode SD1 and the source electrode SD2 are simultaneously formed with the formation of the drain signal line DL.

That is, the drain signal lines DL which extend in the y direction and are arranged in parallel in the x direction are formed on the insulation film GI and a portion of the drain signal line DL is extended onto the semiconductor layer AS so as to form the drain electrode SD1. Further, simultaneously with the formation of the drain electrode SD1, the source electrode SD2 is formed in a state that the source electrode SD2 is spaced apart from the drain electrode SD1 by a length of a channel. The source electrode SD2 is formed in a state that the source electrode SD2 includes an extension portion which slightly extends to the pixel region side and this extension portion is configured to form a contact portion which is electrically connected with the pixel electrode PX described later.

On the surface on which the drain signal line DL, the drain electrode SD1 and the source electrode SD2 are formed, a protective film PAS is formed in a state that the protective film PAS also covers the drain signal line DL and the like. The protective film PAS is provided for avoiding the direct contact of the thin film transistor TFT with the liquid crystal and is formed of an inorganic material layer, an organic material layer or a stacked body of these layers.

The pixel electrode PX is formed on an upper surface of the protective film PAS. The pixel electrode PX is formed on a region where the counter electrode CT is formed in an overlapped manner and is constituted of a group of electrodes consisting of a plurality of strip-like electrodes which extend in the x direction and are arranged in parallel in the y direction.

Further, the respective electrodes of the pixel electrode PX are inclined by making a slight angle with respect to the gate signal line GL so as to produce a so-called multi-domain effect. In this embodiment, the respective electrodes of the pixel PX are configured such that among four respective pixels, the respective electrodes in three pixels from the left are inclined by −θ with respect to the gate signal line GL, while the respective electrodes in remaining one pixel are inclined by −θ+180° with respect to the gate signal line GL.

This provision is provided for acquiring the multi-domain effect in the unit pixel for color display.

Figure 5:
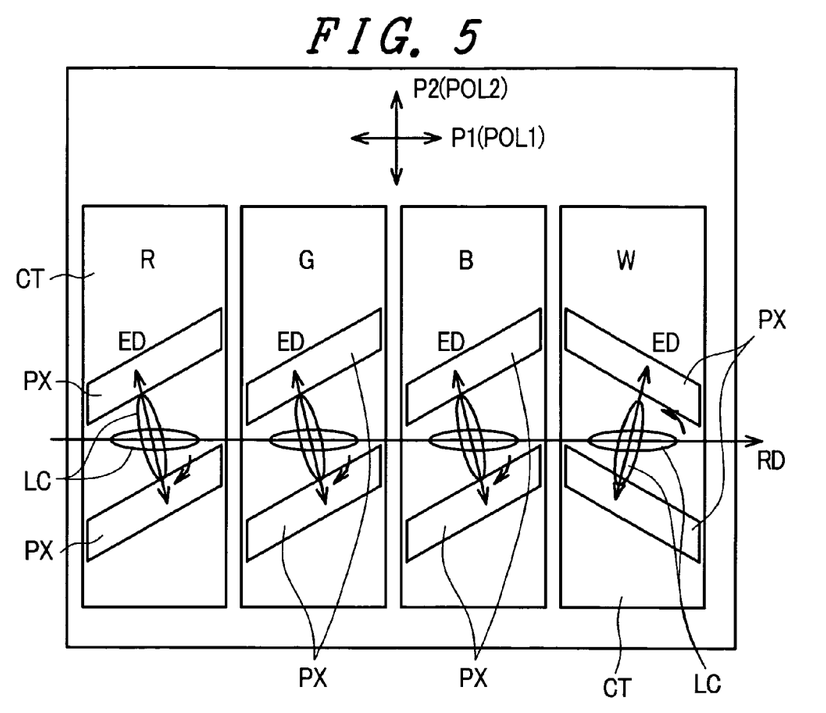
FIG. 5 is a view showing the relationship between the constitution of pixel electrodes and the behavior of liquid crystal molecules in a multi-domain effect.

FIG. 5 is a schematic explanatory view showing the relationship between the arrangement of the pixel electrode PX and the behavior of liquid crystal molecules LC. When a voltage is not applied between the pixel electrode PX and the counter electrode CT, the liquid crystal molecules LC are arranged to be directed in the x direction in the drawing due to the influence of the orientation films OIL1, OIL2 described later. However, when the voltage is applied between the electrode PX and the counter electrode CT, the liquid crystal molecules LC behave to be directed in the direction which substantially crosses the extending direction of the pixel electrode PX in each pixel. Accordingly, although the direction of the behavior (the rotation) of the liquid crystal becomes equal with respect to three pixels from the left among four respective pixels, the direction of the behavior of the liquid crystal of the remaining one pixel becomes different from the direction of the behavior of the liquid crystal of three pixels. This effect is explained later.

Then, as shown in FIG. 1, to connect the pixel electrodes PX in common, for example, a comb-like pattern which connects the pixel electrodes PX at left-side end portions thereof in the drawing is formed.

Further, a portion of the pixel electrode PX is connected with the source electrode SD2 of the thin film transistor TFT via the through hole CN formed in the protective film arranged below the pixel electrode PX. Due to such a constitution, the pixel electrode PX is connected with the drain signal line DL via the thin film transistor TFT.

Here, the pixel electrode PX is formed of a light transmitting layer made of, for example, ITO (Indium Tin Oxide), ITZO (Indium Tin Zinc Oxide), IZO (Indium Zinc Oxide), ZnO (Zinc Oxide), SnO (Tin Oxide), $In_2O_3$ (Indium Oxide). This provision is provided for enhancing a so-called numerical aperture of the pixel.

On a surface on which the pixel electrode PX is formed, the orientation film OIL1 is formed in a state that the orientation film OIL1 also covers the pixel electrode PX, wherein the initial orientation direction of the molecules of liquid crystal which are directly brought into contact with the orientation film OIL1 are determined by the orientation film OIL1.

On a liquid-crystal-side surface of the transparent substrate SUB2 which is arranged to face the transparent substrate SUB1 with the liquid crystal therebetween, a black matrix BM is formed. The black matrix BM is, as shown in FIG. 2, formed to define each pixel from other neighboring pixels and the respective pixels are exposed from opening portions.

On the surface on which the black matrix BM is formed, the color filters FIL are formed in a state that the color filters FIL also covers the opening portions.

Figure 2:
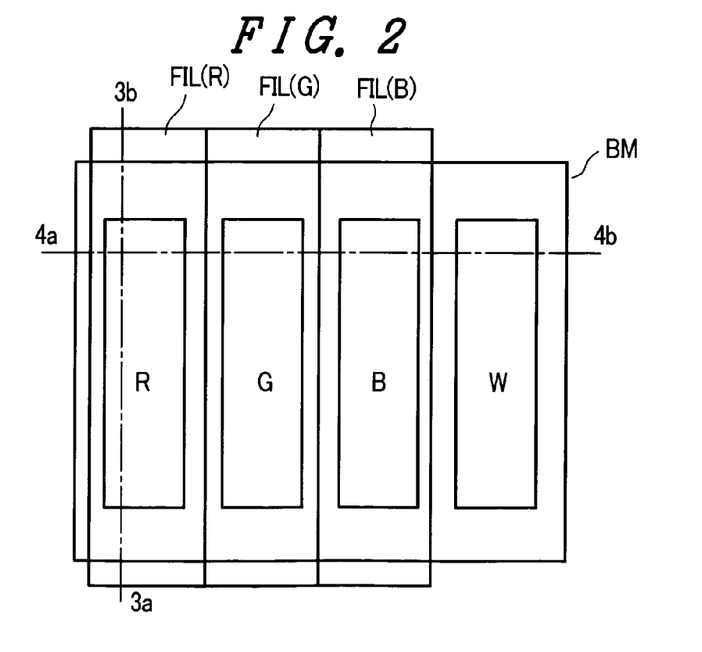
FIG. 2 is a plan view showing one embodiment of a pixel on another substrate side of a liquid crystal display device according to the present invention.

The color filters FIL are, as shown in FIG. 2, constituted of, for example, the color filter FIL of red (R), the color filter FIL of green (G), the color filter FIL of blue (B) and the color filter FIL of white (W) which are arranged from the left to the right and these four pixels form one unit pixel for color display.

Here, as shown in FIG. 4 which is a cross-sectional view taken along a line 4a-4b in FIG. 2, the color filter FIL of red (R), the color filter FIL of green (G) and the color filter FIL of blue (B) are formed of resin films or the like which contain pigments of colors which respectively correspond to the color filter FIL of red (R), the color filter FIL of green (G) and the color filter FIL of blue (B), while the color filter FIL of white (W) is configured not to form the above-mentioned resin film so as to provide a function thereof. Accordingly, the pixel which is allocated to white differs in light transmitting quantity from the pixels which are allocated to other colors thus obtaining the advantageous effects described later.

Further, on a surface on which the color filters FIL are formed, a leveling film OC is formed in a state that the leveling film OC also covers the color filters FIL. An orientation film OIL2 is formed on an upper surface of the leveling film OC.

In the liquid crystal display device having such a constitution, in the unit pixel for color display, the light transmission quantities are reduced attributed to the color filters FIL with respect to the respective pixels which are provided with the respective color filters FIL of red, green and blue. On the other hand, with respect to the pixel which is provided with the color filter of white, since the color filter is not formed on the portion, there is no reduction of the light transmission quantity attributed to the color filter.

Accordingly, it is possible to set the total light transmission quantity in three pixels which are provided with the color filters equal to the light transmission quantity of one pixel which is not provided with the color filter (which is provided with the white filter).

Accordingly, in adopting the multi-domain method, by setting the inclinations of the extending directions of the pixel electrodes PIX of respective pixels to an equal value with respect to the respective pixels which include the red, green and blue color filters FIL and to a value different from the above value with respect to the pixel which includes the white color filter whereby it is possible to obtain an advantageous effect that the coloring of an image attributed to a viewing angle can be compensated without generating the difference in the light transmission quantity.

In the above-mentioned embodiment, the constitutions of the respective pixels in one unit pixel for color display are described. In this case, other unit pixel which is arranged close to one unit pixel may have the substantially equal constitution. However, it is needless to say that, to further enhance the multi-domain effect in a state that the multi-domain effect extend to other unit pixel, some improvements are made with respect to other unit pixel. For example, as mentioned above, in other unit pixel which is arranged close to one unit pixel, the constitutions of the pixels other than the pixel which is provided with the white filter are configured in the same manner as the above-mentioned one unit pixel and, at the same time, the extending direction of the pixel electrodes PX is made different in the pixel having the white filter. This provision is provided for achieving the multi-domain effect of the white color in a state that the multi-domain effect extends to other unit pixel.

Hereinafter, embodiments which include other improvements are explained.

Figure 7A:
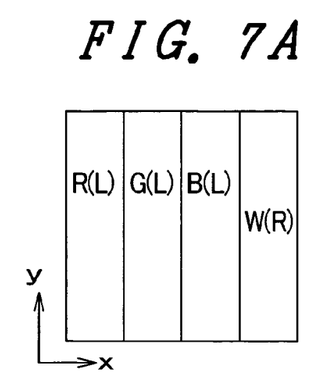
FIGS. 7A-7D are explanatory views showing another embodiment of a liquid crystal display device in a state that a unit pixel adopts the pixel arrangement of 1×4.

Prior to the explanation, FIG. 7A shows one unit pixel for color display which is constituted of four respective pixels (1×4) which are arranged close to each other in parallel in the x direction, wherein the unit pixel includes, from the left side to the right side, the pixel which includes a red color filter (indicated by R in the drawing) and includes a pixel electrode (indicated by L in the drawing) which extends in the left-upward direction, the pixel which includes a green color filter (indicated by G in the drawing) and includes a pixel electrode (indicated by L in the drawing) which extends in the left-upward direction, the pixel which includes a blue color filter (indicated by B in the drawing) and includes a pixel electrode (indicated by L in the drawing) which extends in the left-upward direction, and the pixel which includes a white color filter (indicated by W in the drawing) and includes a pixel electrode (indicated by R in the drawing) which extends in the right-upward direction. This constitution corresponds to the constitution shown in FIG. 1.

Figure 7B:
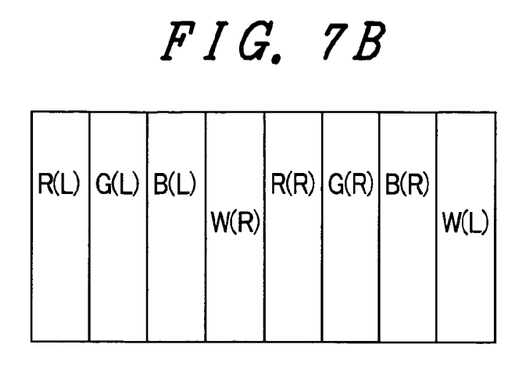

FIG. 7B is a view showing another embodiment of the pixel of the liquid crystal display device of the present invention. In the relationship between one unit pixel for color display shown in FIG. 7A and another one unit pixel which is arranged close to one unit pixel in the x direction, although the arrangement of the color filters FIL of the corresponding pixels is set substantially equal, the extending directions of the pixel electrodes PX in the pixels allocated to the same color are made different from each other between one unit and another one unit. For example, while the pixel electrode PX of the pixel which is allocated to red in one unit pixel extends in the left-upward direction, the pixel electrode PX of the pixel which is allocated to red in another unit pixel extends in the right-upward direction. This provision is provided for acquiring the multi-domain effect of the pixels which are allocated to respective colors between the neighboring unit pixels.

Here, by making the extending directions of the pixel electrodes PX different from each other between the pixels which are allocated to the same color, a pattern of the pixel electrodes PX assumes the line symmetry with respect to a perpendicular at the center of a line which connects the pixels.

Another two unit pixels which are respectively arranged on an upper side, a lower side, a left side and a right side of two unit pixels shown in the drawing also have the substantially same relationship.

Figure 7C:
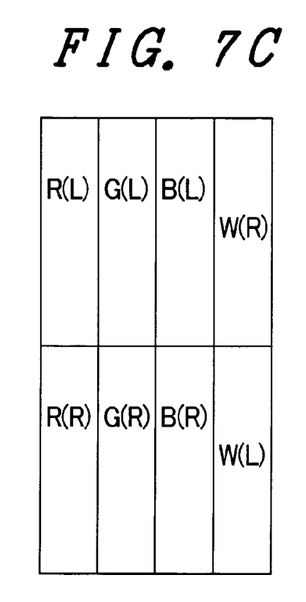

FIG. 7C shows another embodiment of the pixels of the liquid crystal display device according to the present invention. In the relationship between one unit pixel for color display shown in FIG. 7A and another one unit pixel which is arranged close to one unit pixel for color display in the y direction, the arrangement of the color filters of corresponding pixels is set in the same manner. However, in this embodiment, the extending directions of the pixel electrodes PX which are allocated to the same color are made different from each other. In the same manner as the case shown in FIG. 7B, this provision is provided for acquiring the multi-domain effect of the pixels which are allocated to respective colors between the neighboring unit pixels.

Another two unit pixels which are respectively arranged on an upper side, a lower side, a left side and a right side of two unit pixels shown in the drawing also have the substantially same relationship.

Figure 7D:
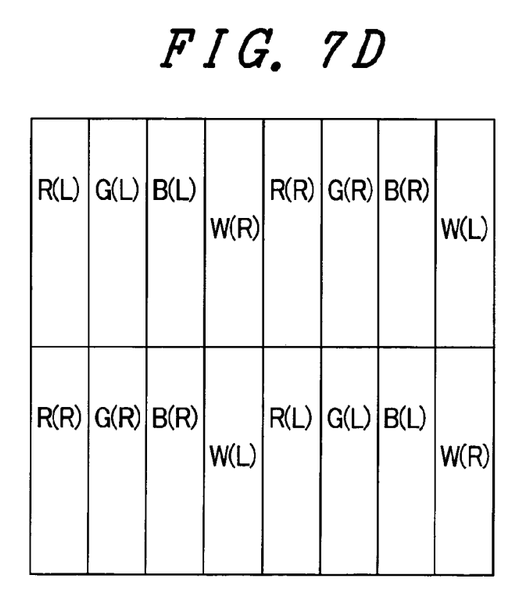

FIG. 7D is a view showing another embodiment of the pixel of the liquid crystal display device of the present invention. In the relationship between two unit pixels for color display shown in FIG. 7B and another two unit pixels which are arranged close to two unit pixels in the y direction or in the relationship between two unit pixels for color display shown in FIG. 7C and another two unit pixels which are arranged close to two unit pixels in the x direction, the arrangement of the color filters FIL of the corresponding pixels is set substantially equal. However, in this embodiment, the extending directions of the pixel electrodes PX in the pixels which are allocated to the same color are made different from each other. This provision is provided for achieving the multi-domain effect of the pixels which are allocated to the respective colors in four respective unit pixels.

Another four unit pixels which are respectively arranged on an upper side, a lower side, a left side and a right side of four unit pixels shown in the drawing also have the substantially same relationship.

Figure 8A:
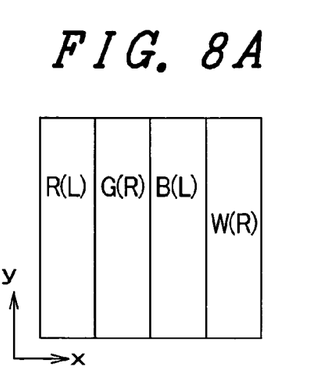
FIGS. 8A-8D are explanatory views showing another embodiment of a liquid crystal display device in a state that a unit pixel adopts the pixel arrangement of 1×4.

FIG. 8A is a view which shows another embodiment of the pixel of the liquid crystal display device according to the present invention and corresponds to FIG. 7A. In the drawing, in one unit pixel for color display which is constituted of four respective pixels (1×4) which are arranged close to each other in parallel in the x direction, the unit pixel includes, from the left side to the right side, the pixel which includes a red color filter (indicated by R in the drawing) and includes a pixel electrode (indicated by L in the drawing) which extends in the left-upward direction, the pixel which includes a green color filter (indicated by G in the drawing) and includes a pixel electrode (indicated by R in the drawing) which extends in the right-upward direction, the pixel which includes a blue color filter (indicated by B in the drawing) and includes a pixel electrode (indicated by L in the drawing) which extends in the left-upward direction, and the pixel which includes a white color filter (indicated by W in the drawing) and includes a pixel electrode (indicated by R in the drawing) which extends in the right-upward direction.

Since one unit pixel is constituted of four pixels, it is possible to constitute one unit pixel while alternately changing the extending direction of the pixel electrode whereby it is possible to achieve the balance of the multi-domain effect in one unit pixel.

Figure 8B:
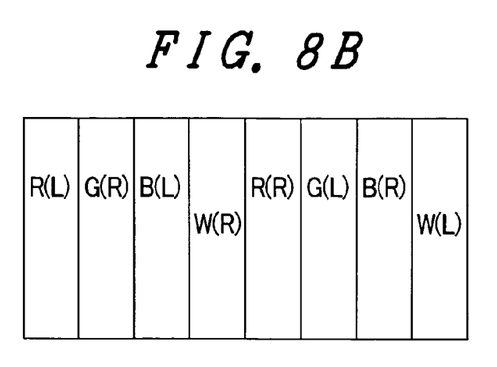

FIG. 8B is a view showing another embodiment of the pixel of the liquid crystal display device of the present invention. In the relationship between one unit pixel for color display shown in FIG. 8A and another one unit pixel which is arranged close to one unit pixel in the x direction, although the arrangement of the color filters FIL of the corresponding pixels is set substantially equal, the extending directions of the pixel electrodes PX in the pixels allocated to the same color are made different from each other between one unit and another one unit. For example, while the pixel electrode PX of the pixel which is allocated to red in one unit pixel extends in the left-upward direction, the pixel electrode PX of the pixel which is allocated to red in another unit pixel extends in the right-upward direction. This provision is provided for acquiring the multi-domain effect of the pixels which are allocate to respective colors between the neighboring unit pixels. Another two unit pixels which are respectively arranged on an upper side, a lower side, a left side and a right side of two unit pixels shown in the drawing also have the substantially same relationship.

Figure 8C:
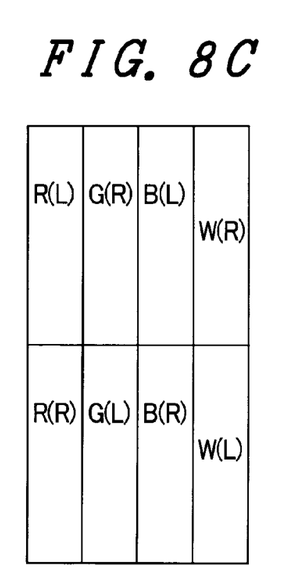

FIG. 8C shows another embodiment of the pixels of the liquid crystal display device according to the present invention. In the relationship between one unit pixel for color display shown in FIG. 8A and another one unit pixel which is arranged close to one unit pixel for color display in the y direction, the arrangement of the color filters of corresponding pixels is set in the same manner. However, in this embodiment, the extending directions of the pixel electrodes PX which are allocated to the same color are made different from each other. In the same manner as the case shown in FIG. 8B, this provision is provided for acquiring the multi-domain effect of the pixels which are allocate to respective colors between the neighboring unit pixels.

Another two unit pixels which are respectively arranged on an upper side, a lower side, a left side and a right side of two unit pixels shown in the drawing also have the substantially same relationship.

Figure 8D:
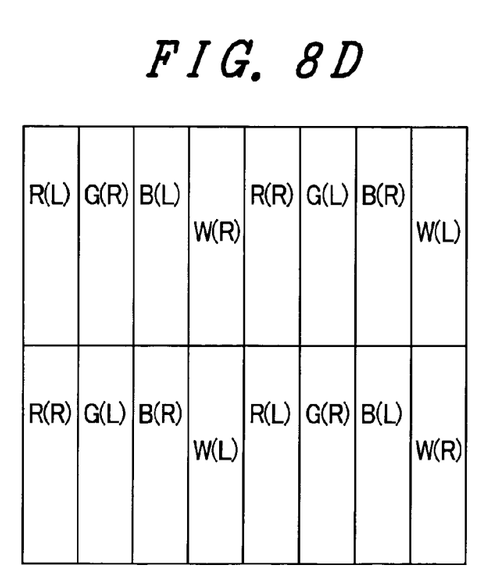

FIG. 8D is a view showing another embodiment of the pixel of the liquid crystal display device of the present invention. In the relationship between two unit pixels for color display shown in FIG. 8B and another two unit pixels which are arranged close to two unit pixels in the y direction or in the relationship between two unit pixels for color display shown in FIG. 8C and another two unit pixels which are arranged close to two unit pixels in the x direction, the arrangement of the color filters FIL of the corresponding pixels is set substantially equal. However, in this embodiment, the extending directions of the pixel electrodes PX in the pixels which are allocated to the same color are made different from each other. This provision is provided for achieving the multi-domain effect of the pixels which are allocated to the respective colors in four respective unit pixels.

Another four unit pixels which are respectively arranged on an upper side, a lower side, a left side and a right side of four unit pixels shown in the drawing also have the substantially same relationship.

Here, it is needless to say that the arrangement rows of the respective color filters in the unit pixel are not limited to the above-mentioned embodiments. To take the mixing of colors from the respective pixels in one unit pixel into consideration, even when the arrangement of white is changed, there exists no difference in view of the observation with naked eyes.

Figure 9:
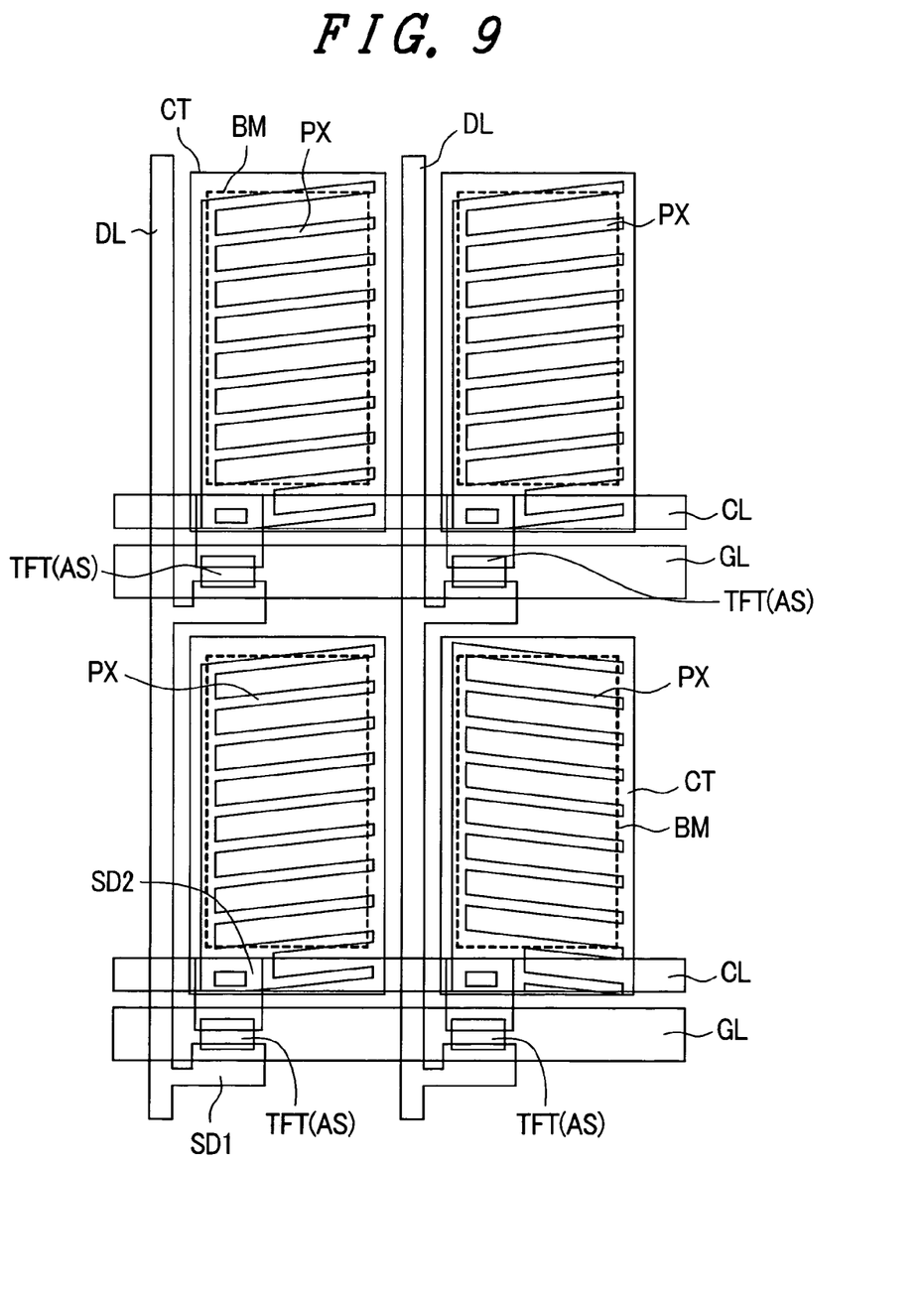
FIG. 9 is a plan view showing another embodiment of a one-substrate side pixel of the liquid crystal display device according to the present invention.

FIG. 9 is a plan view showing another embodiment of the pixel of the liquid crystal display device according to the present invention. Although with respect to the pixel constitution shown in FIG. 1, four pixels which are arranged close to each other in the x direction in the drawing constitute one unit pixel for color display, with respect to a unit pixel shown in FIG. 9, four pixels (2×2) in total which are formed of two pixels arranged close to each other in the x direction and two pixels arranged close to each other in the y direction constitute one unit pixel for color display.

Figure 10:
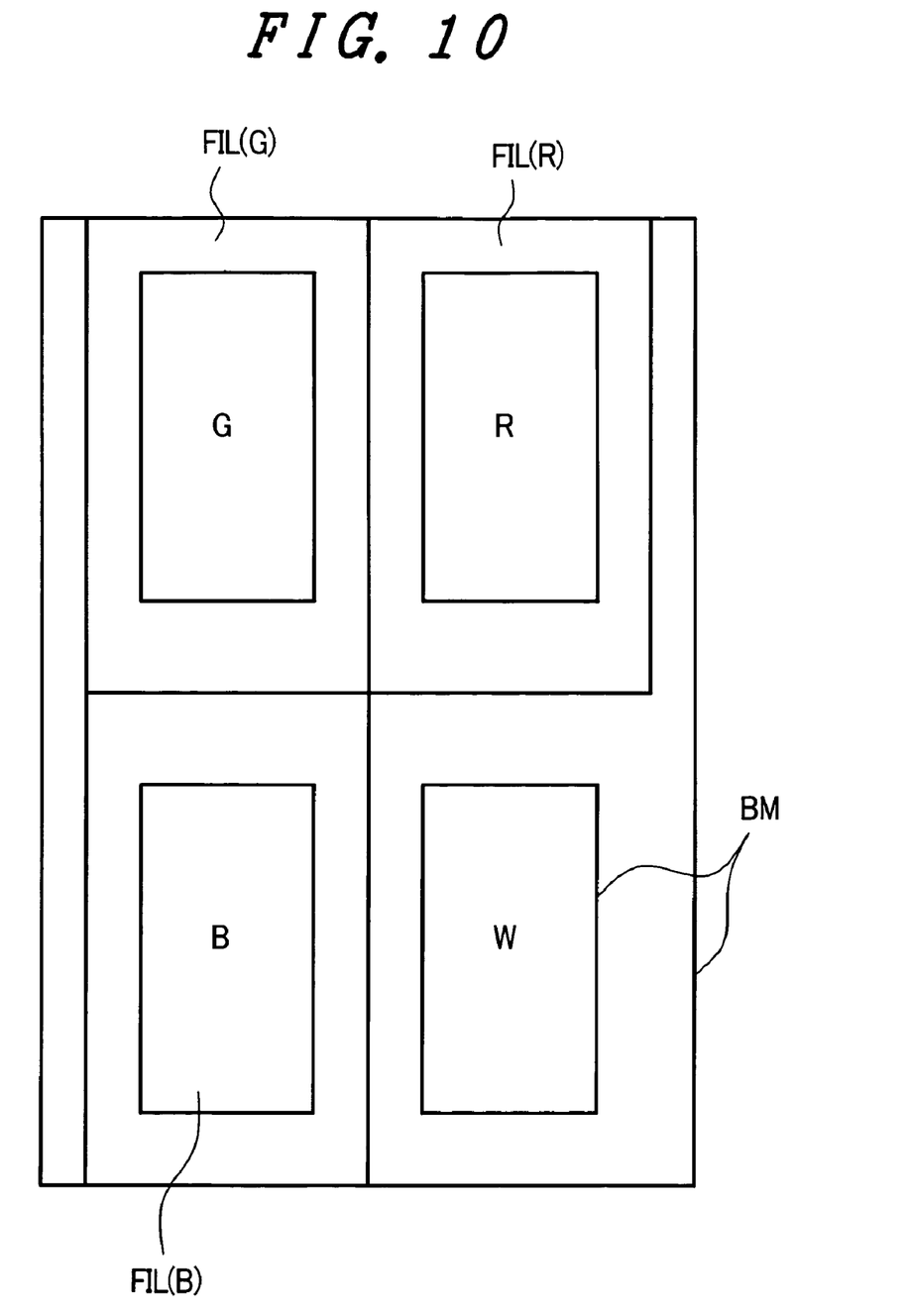
FIG. 10 is a plan view showing one embodiment of an another-substrate side pixel of the liquid crystal display device according to the present invention.

The constitution except for color filters FIL for respective pixels is formed in the same manner as the constitution shown in FIG. 1. With respect to the color filters FIL, as shown in FIG. 10, for example, the color filter FIL of green (G) is allocated to the left upper pixel in the drawing, the color filter FIL of red (R) is allocated to the right upper pixel in the drawing, the color filter FIL of blue (G) is allocated to the left lower pixel in the drawing, the color filter FIL of white (W) is allocated to the right lower pixel in the drawing.

In this case, in the same manner as the case shown in FIG. 1, the inclination of respective electrodes of the pixel electrode PX in the pixel to which the color filter FIL of white (W) is applied is made different from the inclination of the respective electrodes of the pixel electrode PX in the remaining pixels.

In the above-mentioned embodiment, the constitutions of the respective pixels in one unit pixel for color display are described. In this case, other unit pixel which is arranged close to one unit pixel may have the substantially equal constitution. However, it is needless to say that, to further enhance the multi-domain effect in a state that the multi-domain effect extend to other unit pixel, some improvements are made with respect to other unit pixel. For example, in other unit pixel which is arranged close to the above-mentioned unit pixel, the constitutions of the pixels other than the pixel which is provided with the white filter are configured in the same manner as the above-mentioned one unit pixel and, at the same time, the extending direction of the pixel electrodes is made different in the pixel having the white filter. This provision is provided for achieving the multi-domain effect of the white color in a state that the multi-domain effect extends to other unit pixel.

Hereinafter, embodiments which include other improvements are explained.

Figure 11A:
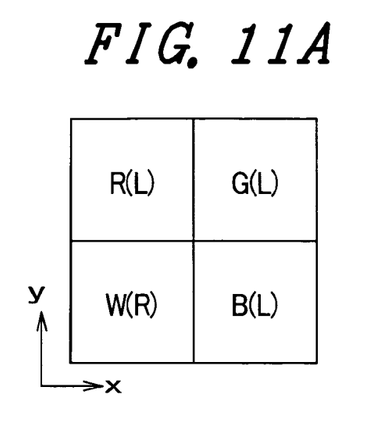
FIGS. 11A-11D are explanatory views showing another embodiment of a liquid crystal display device in a state that a unit pixel adopts the pixel arrangement of 2×2.

Prior to the explanation, although FIG. 11A corresponds to the above-mentioned constitution shown in FIG. 9, as a modification of the constitution shown in FIG. 9, the pixels are depicted such that two pixels (pixels having red and white color filters) which are arranged on the right side are changed to the left side and two pixels (pixels having green and blue color filters) which are arranged on the left side are changed to the right side. This is because such a constitution can obtain the substantially equal advantageous effect as the constitution shown in FIG. 9.

In FIG. 11A, a portion surrounded by a rectangular shape is indicated as one pixel and R, G, B, W described in the inside of the rectangular frames respectively indicate that the a red color filter, a green color filter, a blue color filter and a white color filter are provided to the pixels, while (L), (R) indicate that the pixel electrodes PX respectively extend in the left-upward direction and the right-upward direction.

Figure 11B:
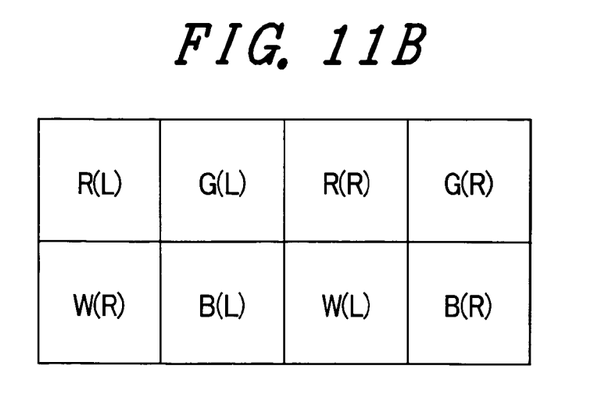

FIG. 11B is a view showing another embodiment of the pixel of the liquid crystal display device of the present invention. In the relationship between one unit pixel for color display shown in FIG. 11A and another one unit pixel which is arranged close to one unit pixel in the x direction, although the arrangement of the color filters FIL of the corresponding pixels is set substantially equal, the extending directions of the pixel electrodes PX in the pixels allocated to the same color are made different from each other between one unit and another one unit. For example, while the pixel electrode PX of the pixel which is allocated to red in one unit pixel extends in the left-upward direction, the pixel electrode PX of the pixel which is allocated to red in another unit pixel extends in the right-upward direction. This provision is provided for acquiring the multi-domain effect of the pixels which are allocate to respective colors between the neighboring unit pixels.

Another two unit pixels which are respectively arranged on an upper side, a lower side, a left side and a right side of two unit pixels shown in the drawing also have the substantially same relationship.

Figure 11C:
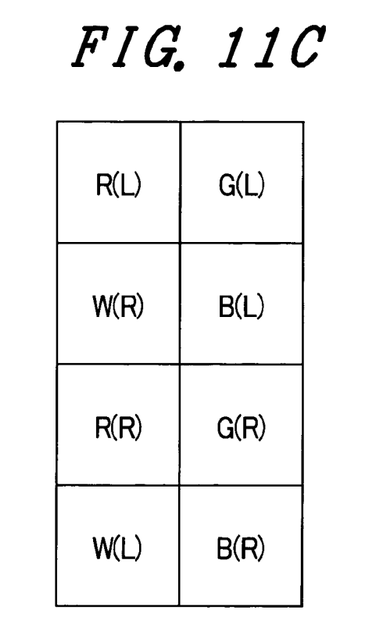

FIG. 11C shows another embodiment of the pixels of the liquid crystal display device according to the present invention. In the relationship between one unit pixel for color display shown in FIG. 11A and another one unit pixel which is arranged close to one unit pixel for color display in the y direction, the arrangement of the color filters of corresponding pixels is set in the same manner. However, in this embodiment, the extending directions of the pixel electrodes PX which are allocated to the same color are made different from each other. In the same manner as the case shown in FIG. 11B, this provision is provided for acquiring the multi-domain effect of the pixels which are allocate to respective colors between the neighboring unit pixels.

Another two unit pixels which are respectively arranged on an upper side, a lower side, a left side and a right side of two unit pixels shown in the drawing also have the substantially same relationship.

Figure 11D:
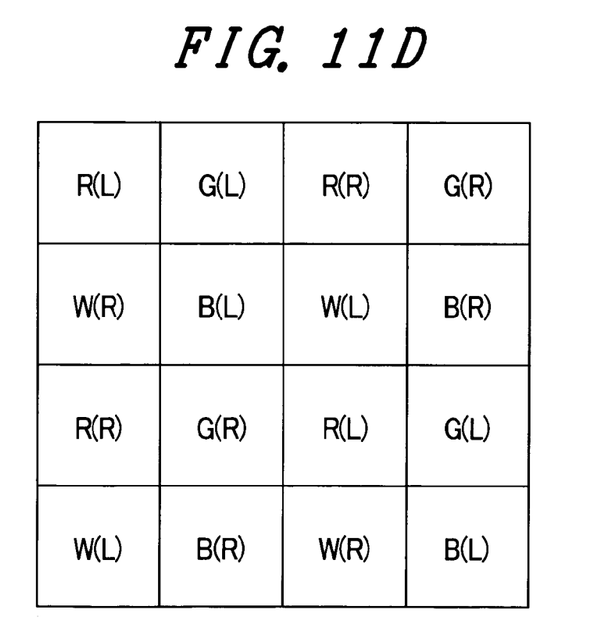

FIG. 11D is a view showing another embodiment of the pixel of the liquid crystal display device of the present invention. In the relationship between two unit pixels for color display shown in FIG. 11B and another two unit pixels which are arranged close to two unit pixels in the y direction or in the relationship between two unit pixels for color display shown in FIG. 11C and another two unit pixels which are arranged close to two unit pixels in the x direction, the arrangement of the color filters FIL of the corresponding pixels is set substantially equal. However, in this embodiment, the extending directions of the pixel electrodes PX in the pixels which are allocated to the same color are made different from each other. This provision is provided for achieving the multi-domain effect of the pixels which are allocated to the respective colors in four respective unit pixels.

Another four unit pixels which are respectively arranged on an upper side, a lower side, a left side and a right side of four unit pixels shown in the drawing also have the substantially same relationship.

Figure 12A:
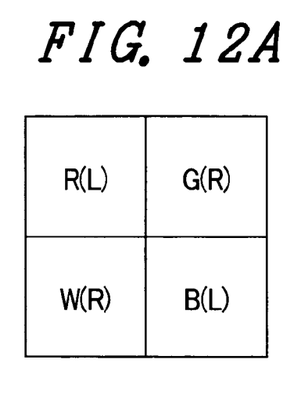
FIGS. 12A-12D are explanatory views showing another embodiment of a liquid crystal display device in a state that a unit pixel adopts the pixel arrangement of 2×2.

FIG. 12A is a view which shows another embodiment of the pixel of the liquid crystal display device according to the present invention and corresponds to FIG. 11A. In comparison with the case shown in FIG. 11A, although the color filters of the respective colors are arranged at the same positions, the extending directions of the pixel electrodes in the respective pixels are alternately made different in the clockwise direction in order of the left-upward direction (L), the right-upward direction (R), the left-upward direction (L), the right-upward direction, the left-upward direction (L).

Since one unit pixel is constituted of four pixels, it is possible to arrange the extending directions of the pixel electrodes of the pixels which are arranged close to each other in a line symmetry whereby it is possible to achieve the balance of the multi-domain effect in one unit pixel.

Figure 12B:
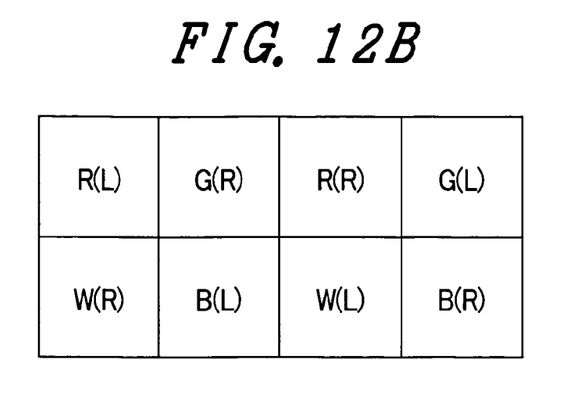

FIG. 12B is a view showing another embodiment of the pixel of the liquid crystal display device of the present invention. In the relationship between one unit pixel for color display shown in FIG. 12A and another one unit pixel which is arranged close to one unit pixel in the x direction, although the arrangement of the color filters FIL of the corresponding pixels is set substantially equal, the extending directions of the pixel electrodes PX in the pixels allocated to the same color are made different from each other between one unit and another one unit. For example, while the pixel electrode PX of the pixel which is allocated to red in one unit pixel extends in the left-upward direction, the pixel electrode PX of the pixel which is allocated to red in another unit pixel extends in the right-upward direction. This provision is provided for acquiring the multi-domain effect of the pixels which are allocate to respective colors between the neighboring unit pixels.

Another two unit pixels which are respectively arranged on an upper side, a lower side, a left side and a right side of two unit pixels shown in the drawing also have the substantially same relationship.

Figure 12C:
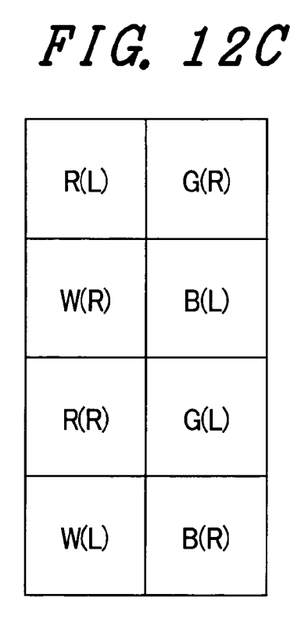

FIG. 12C shows another embodiment of the pixels of the liquid crystal display device according to the present invention. In the relationship between one unit pixel for color display shown in FIG. 12A and another one unit pixel which is arranged close to one unit pixel for color display in the y direction, the arrangement of the color filters of corresponding pixels is set in the same manner. However, in this embodiment, the extending directions of the pixel electrodes PX which are allocated to the same color are made different from each other. In the same manner as the case shown in FIG. 12B, this provision is provided for acquiring the multi-domain effect of the pixels which are allocate to respective colors between the neighboring unit pixels.

Another two unit pixels which are respectively arranged on an upper side, a lower side, a left side and a right side of two unit pixels shown in the drawing also have the substantially same relationship.

Figure 12D:
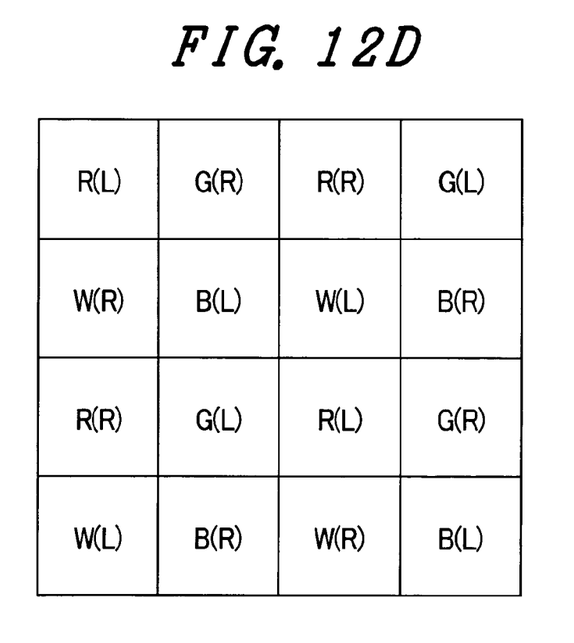

FIG. 12D is a view showing another embodiment of the pixel of the liquid crystal display device of the present invention. In the relationship between two unit pixels for color display shown in FIG. 12B and another two unit pixels which are arranged close to two unit pixels in the y direction or in the relationship between two unit pixels for color display shown in FIG. 12C and another two unit pixels which are arranged close to two unit pixels in the x direction, the arrangement of the color filters FIL of the corresponding pixels is set substantially equal. However, in this embodiment, the extending directions of the pixel electrodes PX in the pixels which are allocated to the same color are made different from each other. This provision is provided for achieving the multi-domain effect of the pixels which are allocated to the respective colors in four respective unit pixels.

Another four unit pixels which are respectively arranged on an upper side, a lower side, a left side and a right side of four unit pixels shown in the drawing also have the substantially same relationship.

The above-mentioned respective embodiments may be used in a single form or in combination. This is because that the respective embodiments can obtain the advantageous effects individually as well as synergistically.

In the above-mentioned embodiments, the pixel is formed by sequentially stacking the planar counter electrode CT, the insulation films (the insulation film GI, the protective film PAS) and the pixel electrode PX. However, it is needless to say that, for example, either one of the pixel electrode PX or the counter electrode CT is formed of a group of electrodes which consists of a plurality of electrodes and these electrodes are arranged to cross each other. In this case, even when the insulation film is not interposed between the pixel electrode PX and the counter electrode CT, it is possible to obtain the substantially equal advantageous effects.

What is claimed is:

1. A liquid crystal display device comprising:
    a least one red pixel including a red color filter and a pixel electrode;
    at least one green pixel including a green color filter and a pixel electrode;
    at least one blue pixel including a blue color filter and a pixel electrode; and
    at least one white pixel including a white color filter and a pixel electrode;
    wherein a first row of pixels includes a first red pixel, a first green pixel, a first blue pixel, and a first white pixel, and a second row of pixels includes a second red pixel, a second green pixel, a second blue pixel and a second white pixel;
    wherein each pixel electrode includes one part extending in one direction along a signal line and a plurality of other parts connected to and extending from the one part, and substantially all of the plurality of other parts of a respective pixel electrode extend from the one part in one of a first direction and a second direction which is different from the one direction;
    wherein substantially all of the plurality of other parts of the pixel electrode of the first red pixel, the first green pixel, and the first blue pixel of the first row of pixels extend along the first direction;
    wherein substantially all of the plurality of other parts of the pixel electrode of the second red pixel, the second green pixel, and second blue pixel of the second row of pixels extend along the second direction; and
    wherein substantially all of the plurality of other parts of the pixel electrode of the first white pixel of the first row of pixels extend along the second direction, and substantially all of the plurality of other parts of the pixel electrode of the second white pixel of the second row of pixels extend along the first direction.

2. A liquid crystal display device according to claim 1, further comprising at least one planar counter electrode, wherein a respective pixel electrode is overlapped with a respective planar counter electrode.

3. A liquid crystal display device according to claim 1, further comprising respective planar counter electrodes overlapped by respective pixel electrodes, wherein the planar counter electrode has a peripheral portion formed along an opening portion of a black matrix.

4. A liquid crystal display device according to claim 1, wherein the first and second rows of pixels are adjacent rows of pixels.

5. A liquid crystal display device according to claim 1, wherein substantially all of the plurality of other parts of a respective pixel are asymmetrically arranged with respect to the one pad.

6. A liquid crystal display device comprising:
    at least one unit pixel including a first unit pixel and a second unit pixel;
    wherein the at least one unit pixel including a 2×2 pixel array;
    wherein the first unit pixel includes a first red pixel, a first green pixel, a first blue pixel, and a first white pixel, and the second unit pixel includes a second red pixel, a second green pixel, a second blue pixel and a second white pixel;
    wherein each of the red, green, blue, and white pixels include a pixel electrode having one part extending in one direction along a signal line and a plurality of other parts connected to and extending from the one part, and substantially all of the plurality of other arts of a respective pixel electrode wherein one of a first direction and a second direction which is different from the one direction;

wherein substantially all of the plurality of other parts of the pixel electrode of the first red pixel, the first green pixel and the first blue pixel of the first unit pixel extend along the first direction;

wherein substantially all of the plurality of other parts of the pixel electrode of the second red pixel, the second green pixel, and the second blue pixel of the second unit pixel extend along the second direction; and wherein substantially all of the plurality of other parts of the pixel electrode of the first white pixel of the first unit pixel extends along the second direction, and substantially all of the plurality of other parts of the pixel electrode of the second white pixel of the second unit pixel extend along the first direction.

7. A liquid crystal display device according to claim 6, further comprising at least one planar counter electrode, wherein a respective pixel electrode is overlapped with a respective planar counter electrode.

8. A liquid crystal display device according to claim 6, further comprising respective planar counter electrodes overlapped by respective the pixel electrodes, wherein the planar counter electrode has a peripheral portion formed along an opening portion of a black matrix.

9. A liquid crystal display device according to claim 6, wherein the first and second unit pixels are adjacent unit pixels.

10. A liquid crystal display device according to claim 6, wherein substantially all of the plurality of other parts of a respective pixel are asymmetrically arranged with respect to the one part.

11. A liquid crystal display device comprising:
a least one red pixel including a red color filter and a pixel electrode;
at least one green pixel including a green color filter and a pixel electrode;
at least one blue pixel including a blue color filter and a pixel electrode; and
at least one white pixel including a white color filter and a pixel electrode;
wherein a first row of pixels includes a first red pixel, a first green pixel, a first blue pixel, and a first white pixel, and a second row of pixels includes a second red pixel, a second green pixel, a second blue pixel and a second white pixel;
wherein each pixel electrode of the red, green, blue, and white pixels has one part extending in one direction along a signal line and a plurality of other parts connected to and extending from the one part, and substantially all of the other parts of a respective pixel electrode extend from the one part in one of a first direction and a second direction which is different from the one direction;
wherein substantially all of the plurality of other parts of the pixel electrode of the first red pixel, the first green pixel and the first blue pixel of the first row of pixels extend along the first direction;
wherein substantially all of the plurality of other parts of the pixel electrode of the second red pixel, the second green pixel, and second blue pixel of the second row of pixels extend along the second direction;

wherein substantially of the plurality of other parts of the pixel electrode of the first white pixel of the first row of pixels extend along the second direction, and substantially all of the plurality of other parts of the pixel electrode of the second white pixel of the second row of pixels extend along the first direction; and wherein the first direction and the second direction are in a line symmetry.

12. A liquid crystal display device according to claim 11, further comprising at least one planar counter electrode, wherein a respective pixel electrode is overlapped with a respective planar counter electrode.

13. A liquid crystal display device according to claim 11, further comprising respective planar counter electrodes overlapped by respective pixel electrodes, wherein the planar counter electrode has a peripheral portion formed along an opening portion of a black matrix.

14. A liquid crystal display device according to claim 11, wherein the first and second rows of pixels are adjacent rows of pixels.

15. A liquid crystal display device according to claim 11, wherein substantially all of the plurality of other pads of a respective pixel are asymmetrically arranged with respect to the one pad.

16. A liquid crystal display device comprising:
a red pixel including a pixel electrode;
a green pixel including a pixel electrode;
a blue pixel including a pixel electrode; and
a white pixel including a pixel electrode;
wherein the red, green, blue, and white pixels are adjacently arranged in a predetermined pixel pattern;
wherein each pixel electrode includes one part extending in one direction along a signal line and a plurality of other parts connected to and extending from the one part, and substantially all of the other parts of a respective pixel extend from the one part in one of a first direction and a second direction which is different from the one direction;
wherein substantially all of the plurality of other parts of the pixel electrode of the red pixel, the green pixel, and the blue pixel of the predetermined pixel pattern extend along one of the first direction and the second direction; and
wherein substantially all of the plurality of other parts of the pixel electrode of the white pixel of the predetermined pixel pattern extend along the other of the first direction and the second direction.

17. A liquid crystal display device according to claim 16, wherein substantially all of the plurality of other parts of the pixel electrode of the red pixel, the green pixel and the blue pixel of the predetermined pixel pattern extend along the first direction, and substantially all of the plurality of other parts of the pixel electrode of the white pixel of the predetermined pixel arrangement extend along the second direction.

18. A liquid crystal display device according to claim 16, wherein substantially all of the plurality of other parts of the pixel electrode of the red pixel, the green pixel and the blue pixel of the predetermined pixel pattern extend along the second direction, and substantially all of the plurality of other parts of the pixel electrode of the white pixel of the predetermined pixel arrangement extend along the first direction.

19. A liquid crystal display device according to claim 16, wherein substantially all of the plurality of other pads of a respective pixel are asymmetrically arranged with respect to the one pad.

* * * * *